US011999597B2

(12) United States Patent
Yamakawa et al.

(10) Patent No.: US 11,999,597 B2
(45) Date of Patent: Jun. 4, 2024

(54) CONTROL SYSTEM FOR CONTAINER CRANE AND CONTROL METHOD FOR CONTAINER CRANE

(71) Applicant: MITSUI E&S MACHINERY CO., LTD., Tokyo (JP)

(72) Inventors: Yasuji Yamakawa, Oita (JP); Takashi Ito, Oita (JP); Yohei Suzuki, Oita (JP)

(73) Assignee: Mitsul E&S Co., Ltd, Tokyo (JP)

( * ) Notice: Subject to any disclaimer, the term of this patent is extended or adjusted under 35 U.S.C. 154(b) by 1225 days.

(21) Appl. No.: 16/617,964

(22) PCT Filed: Mar. 16, 2018

(86) PCT No.: PCT/JP2018/010655
§ 371 (c)(1),
(2) Date: Nov. 27, 2019

(87) PCT Pub. No.: WO2018/220951
PCT Pub. Date: Dec. 6, 2018

(65) Prior Publication Data

US 2020/0109036 A1 Apr. 9, 2020

(30) Foreign Application Priority Data

May 30, 2017 (JP) ................................ 2017-106955

(51) Int. Cl.
*B66C 13/48* (2006.01)
*B66C 13/46* (2006.01)
*B66C 19/00* (2006.01)

(52) U.S. Cl.
CPC .............. *B66C 13/48* (2013.01); *B66C 13/46* (2013.01); *B66C 19/002* (2013.01)

(58) Field of Classification Search
CPC ........ B66C 13/48; B66C 13/46; B66C 19/002
See application file for complete search history.

(56) References Cited

U.S. PATENT DOCUMENTS 3,742,494 A * 6/1973 Embling .................. G01S 7/24 342/55
9,667,923 B2 * 5/2017 Tanizumi ............. H04N 23/635
(Continued)

FOREIGN PATENT DOCUMENTS

JP H06-312894 A 11/1994
JP 2005-138952 A 6/2005
(Continued)

*Primary Examiner* — Kyle O Logan
(74) *Attorney, Agent, or Firm* — Carrier, Shende & Associates P.C.; Joseph P. Carrier; Jeffrey T. Gedeon

(57) ABSTRACT

Provided are a control system for a container crane and a control method for a container crane in which the time necessary for position adjustment between the spreader and the landing surface is reduced and the cargo handling efficiency is improved. A control system of a container crane has a camera, a display device, position acquisition devices, and a control device. Based on the plane positions of a spreader and a landing surface acquired by the position acquisition devices, the control device superimposes, on an image captured by the camera, an indication display from which it is understood that the positions of the spreader and the landing surface have agreed with each other in plan view, and the control device displays a resultant image with the image and the indication display superimposed on the display device.

7 Claims, 6 Drawing Sheets

(56) References Cited

U.S. PATENT DOCUMENTS

| | | | | |
|---|---|---|---|---|
| 2013/0013144 | A1* | 1/2013 | Tanizumi | B66C 23/905<br>701/34.4 |
| 2016/0119589 | A1* | 4/2016 | Tanizumi | H04N 23/635<br>345/173 |

FOREIGN PATENT DOCUMENTS

| | | | |
|---|---|---|---|
| JP | 2014-172754 | A | 9/2014 |
| JP | 2015-219107 | A | 12/2015 |
| JP | 2016-179889 | A | 10/2016 |

* cited by examiner

CONTROL SYSTEM FOR CONTAINER CRANE AND CONTROL METHOD FOR CONTAINER CRANE

TECHNICAL FIELD

The present invention relates to control systems for container cranes and control methods for container cranes and, more particularly, relates to a control system for a container crane and a control method for a container crane having improved cargo handling efficiency.

BACKGROUND ART

For devices that enable remote operation of a crane with a hook, a device is proposed that displays, on an image captured by a camera, a projection corresponding point that corresponds to the projection point at which the hook is projected on a horizontal plane at a specific height such as the ground surface (for example, see patent document 1).

This device displays the projection corresponding point superimposed on the image captured by the camera, thereby making it easy for an operator who is remotely operating the crane to understand the position of the projection point of the hook on the horizontal plane at a specific height such as the ground surface.

PRIOR ART DOCUMENT

Patent Document

Patent Document 1: Japanese patent application Kokai publication No. 2016-179889

SUMMARY OF THE INVENTION

Problem to be Solved by the Invention

For the crane with a hook disclosed in patent document 1, a worker on the ground slings a cargo on the hook using wire or rope. Thus, for cranes with a hook, it is only necessary to make it easier for the operator to understand the position of the projection point of the hook because a worker on the ground slings a cargo on the hook as described above.

On the other hand, container cranes that load and unload containers in the container terminal need to hold a container directly with a spreader without relying on work by a worker on the ground. Thus, for container cranes, when the operator lands the spreader suspended with wire on a landing surface, the positions of the spreader and the landing surface need to be adjusted accurately.

However, since this position adjustment is made by visual check of the operator, there is a problem that a sophisticated skill is necessary to adjust the position of the spreader with high accuracy to the landing surface several tens meters below, and that thus cargo handling efficiency is low for inexperienced operators.

Since the device disclosed in patent document 1 only allows the operator to understand the position of the projection point of the spreader, the operator cannot perform correctly position adjustment between the spreader and the landing surface. Therefore, even if the device disclosed in patent document 1 is integrated into a container crane, it does not reduce the time necessary to perform position adjustment between the spreader and the landing surface, not leading to a solution for the problem that the cargo handling efficiency is low.

An object of the present invention is to provide a control system for a container crane and a control method for a container crane that reduce the time necessary for position adjustment between the spreader and the landing surface and improve the cargo handling efficiency.

Means for Solving the Problem

A control system for a container crane according to the present invention to achieve the above object is a control system for a container crane including a girder extending in one direction, a trolley that is supported by the girder and moves in the one direction in which the girder extends, and a spreader suspended from the trolley with wire, characterized in that the control system comprises: a camera that is disposed on the trolley and sequentially captures an image of the spreader and a portion below the spreader; a display device that sequentially displays the image captured by the camera; a position acquisition device that acquires plane positions of the spreader and a landing surface on which the spreader is to land; and a control device connected to the camera, the display device, and the position acquisition device, and based on the plane positions of the spreader and the landing surface acquired by the position acquisition device, the control device superimposes, on the image, an indication display from which it is understood that the positions of the spreader and the landing surface have agreed with each other in plan view, and the control device displays a resultant image with the image and the indication display superimposed on the display device.

A control method of controlling a container crane according to the present invention to achieve the above object is a control method of controlling a container crane, including lowering a spreader suspended with wire from a trolley that is supported by a girder extending in one direction and travels in the one direction in which the girder extends, and landing a lower end of the spreader or a lower end of a container held by the spreader on a landing surface, characterized in that the control method comprises: sequentially capturing an image of the spreader and a portion below the spreader with a camera disposed on the trolley; acquiring plane positions of the spreader and the landing surface on which the spreader is to land with a position acquisition device; and with a control device, creating an indication display from which it is understood that the positions of the spreader and the landing surface have agreed with each other in plan view based on the acquired plane positions of the spreader and the landing surface, superimposing the created indication display on the image, and sequentially displaying a resultant image with the image and the indication display superimposed on a display device.

Effects of the Invention

In the present invention, an indication display from which it is understood that the positions of the spreader and the landing surface have agreed with each other in plan view is superimposed on the image captured by the camera based on the plane positions of the spreader and the landing surface, and the image is displayed on the display device. Therefore, the operator operating the container crane can lower the spreader based on the indication display and land the spreader on the landing surface with the positions of the spreader and the landing surface in agreement.

In summary, the present invention makes it possible to tell the operator accurately the timing to lower the spreader by showing the indication display that tells the timing. Landing the spreader according to this indication display is advantageous to reduce the time necessary for position adjustment between the spreader and the landing surface even for inexperienced operators, and this improves the cargo handling efficiency.

MODES FOR CARRYING OUT THE INVENTION

Figure 1:
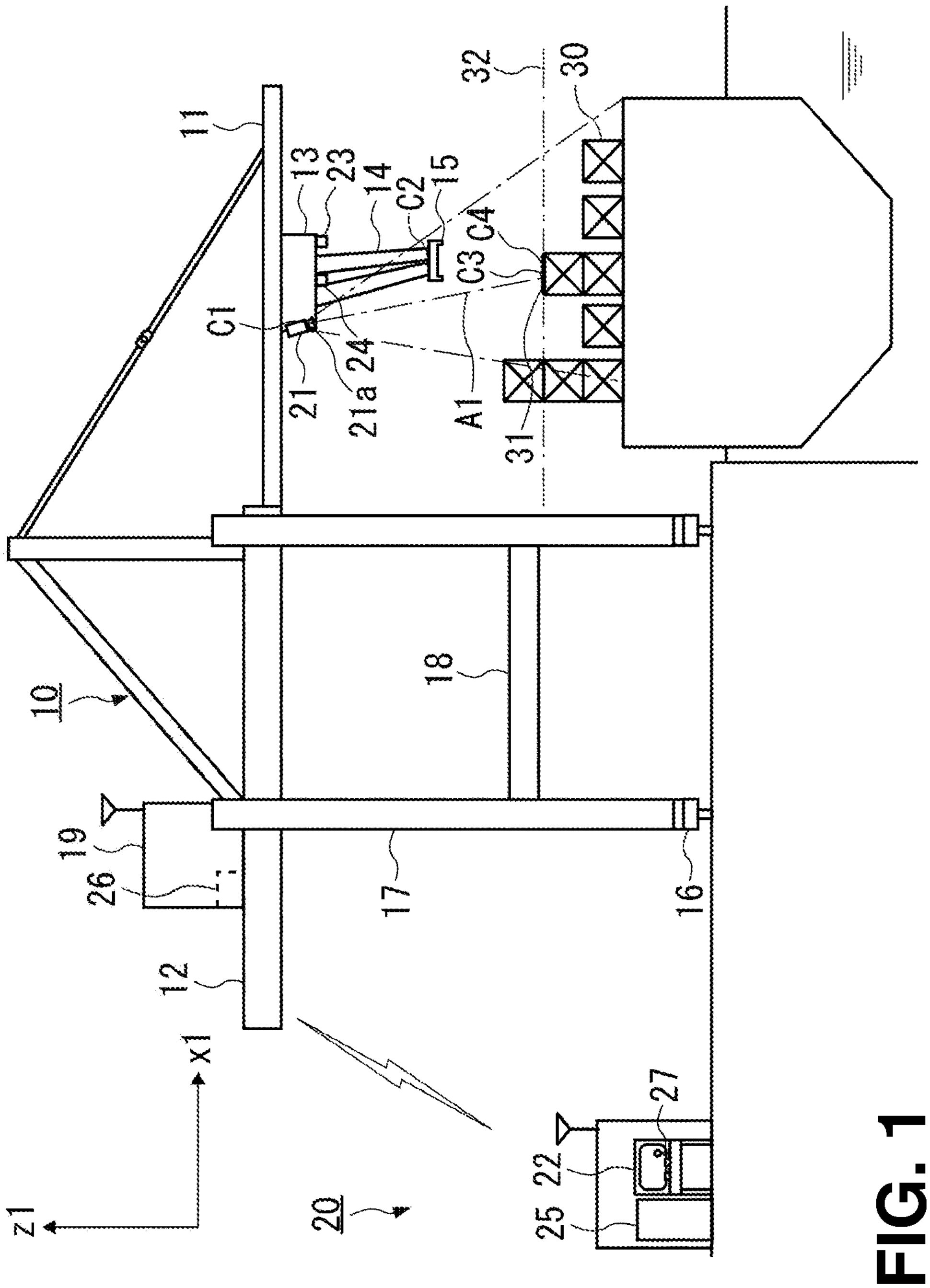
FIG. 1 is a configuration diagram illustrating an example of an embodiment of a control system for a container crane according to the present invention.

Hereinafter, an embodiment of a control system and control method for a container crane according to the present invention will be described. In the figures, the direction in which girder portion (11, 12) of a container crane 10 extend is the x1 direction; the direction, orthogonal to the x1 direction, in which the container crane 10 moves using travel devices 16 is the y1 direction; and the vertical direction is the z1 direction. In the image P1, the vertical direction is the x2 direction, and the horizontal direction is the y2 direction.

A control system 20 of the container crane 10 according to a first embodiment shown as an example in FIGS. 1 to 4 is used when an operator in a facility away from the container crane 10 remotely operates the container crane 10 to load or unload containers 30.

As shown in FIG. 1 as an example, the container crane 10 loads or unloads containers 30 onto or from a ship anchored at a quay. The container crane 10 includes a boom 11 and girder 12 as a girder portion extending in the x1 direction, a trolley 13 that is supported by the boom 11 and the girder 12 and moves in the x1 direction, and a spreader 15 suspended from the trolley 13 with wire 14.

The spreader 15 is suspended with multiple pieces of wire 14 hanging down from a center portion of the trolley 13 in plan view, and the spreader 15 moves up and down by winding or unwinding the wire 14.

The girder portion (11, 12) is supported at an upper portion of a leg structure (16, 17, 18). The boom 11 protrudes from the leg structure on the sea side in the x1 direction, and the girder 12 protrudes from the leg structure on the land side in the x1 direction. The leg structure is provided at its lower ends with the travel devices 16 capable of traveling along rails laid on the quay and extending in the y1 direction. The leg structure includes multiple leg members 17 extending upward from the travel devices 16 and a horizontal beam 18 connecting the leg members 17.

The container crane 10 has, in a machine room 19, a traverse device for the trolley 13 and a lift device that winds or unwinds the wire 14 to lift up or down the spreader 15.

The control system 20 of the container crane 10 has a camera 21, a display device 22, position acquisition devices 23 and 24, a control device 25, a crane control device 26, and an operation device 27.

The camera 21 is disposed on the trolley 13 and sequentially captures images P1 of the spreader 15 and portions below the spreader 15. The portions below the spreader 15 include the portion right below the spreader 15 in the z1 direction.

Specifically, the camera 21 is disposed on the end portion of the trolley 13 on the land side in the x1 direction in side view, and a camera lens 21*a* is directed obliquely downward. The optical axis A1 of the camera 21 is inclined relative to the z1 direction in side view such that the upper portion is directed on the land side in the x1 direction and the lower portion is directed on the sea side in the x1 direction. The optical axis A1 is an imaginary axis that passes through camera center point C1, which is the center of the camera lens 21*a*, and extends in a direction perpendicular to the camera lens 21*a* plane. The optical axis A1 is inclined counterclockwise by angle θ1 relative to the z1 direction. Angle θ1 is set to an angle that allows the image P1 captured by the camera 21 to include the spreader 15 and the upper face of a container 30 located right below the spreader 15 in the z1 direction.

The camera lens 21*a* is directed obliquely downward as described above so that the spreader 15 and the container 30 loaded on a ship can be seen from above, and thus, the captured image P1 reproduces the view of an operator on board the cab disposed on the trolley of the container crane that is not remotely operated. Since the captured image P1 reproduces the view of an operator on board the cab, even though an operator in a facility away from the container crane 10 performs remote operation, the operator can perform the remote operation as if the operator is on board the cab. This is advantageous to reduce the sense of incongruity caused by the remote operation.

Note that the camera 21 only needs to be capable of sequentially capturing images P1 including the spreader 15 and the portion right below the spreader 15 in the z1 direction. The position of the camera 21 and the direction of the camera lens 21*a* may be changed appropriately except the state where the camera 21 is disposed right above the spreader 15 in the z1 direction and the camera lens 21*a* is directed vertically downward in the z1 direction.

The display device 22 is composed of a display that sequentially displays images P1 captured by the camera 21. The display device 22 is disposed in the facility away from the container crane 10 and sequentially displays images P1 for the operator who is remotely operating the container crane 10.

The position acquisition devices 23 and 24 are disposed on the trolley 13. The position acquisition devices 23 and 24 add the height positions to the plane positions of the spreader 15 and a landing surface 31 to acquire the three-dimensional positions. Specifically, the position acquisition devices 23 and 24 acquire the three-dimensional positions of spreader center point C2, landing-surface center point C3, and projection point C4.

In this embodiment, the position acquisition device 23 is composed of a shape recognition system including a two-dimensional laser sensor or a three-dimensional laser sensor, and the position acquisition device 24 is composed of a sway angle sensor. The position acquisition devices 23 and 24 are not limited to the above configurations as long as the position acquisition devices 23 and 24 are capable of acquiring at least the plane positions of the spreader 15 and the landing surface 31. Examples of devices that acquire the plane position of the spreader 15 includes a GPS receiver and a device that measures the length of wound or unwound wire 14. Examples of devices that acquire the plane position of the landing surface 31 include a laser sensor disposed on the spreader 15. As an alternative, the position acquisition device 23 may be composed of two devices, a device that acquires the plane position of the spreader 15 and a device that acquires the plane position of the landing surface 31.

The spreader 15 has, in plan view, approximately a rectangular shape the short sides of which are directed in the x1 direction and the long sides of which are directed in the y1 direction, and spreader center point C2, which is the center of the spreader 15, is at the intersection point of the diagonal lines of the rectangular shape.

The landing surface 31 is a surface where the lower end of the spreader 15 or the lower end of the container 30 held by the spreader 15 is to land. Examples of the landing surface 31 include the ground surface, the ground contact surface of a ship, and the upper surface of the container 30. The landing surface 31 has approximately a rectangular shape in plan view in the same way as for the spreader 15 or the container 30, and landing-surface center point C3, which is the center of the landing surface 31, is at the intersection point of the diagonal lines of the rectangular shape.

Projection point C4 is a point at which spreader center point C2 is vertically projected on a horizontal plane 32 including the landing surface 31.

The control device 25 is hardware composed of a CPU that performs various information processes, an internal storage device capable of reading and writing programs and information processing results used for performing the various information processes, various interfaces, and others. The control device 25 is disposed in the facility away from the container crane 10 and electrically connected to the display device 22 and the operation device 27 via signal lines represented by dashed dotted lines. The control device 25 is also communicably connected to the camera 21 and the position acquisition devices 23 and 24 via communication lines such as wireless antennas or optical fibers.

The crane control device 26 is hardware composed of a CPU, an internal storage device, various interfaces, and others in the same way as for the control device 25. The crane control device 26 is disposed in the machine room 19 of the container crane 10 and electrically connected to the traverse device for the trolley 13, the lift device for the spreader 15, and the travel devices 16 via signal lines represented by dashed dotted lines. The crane control device 26 is also communicably connected to the operation device 27 via a wireless antenna.

Figure 2:
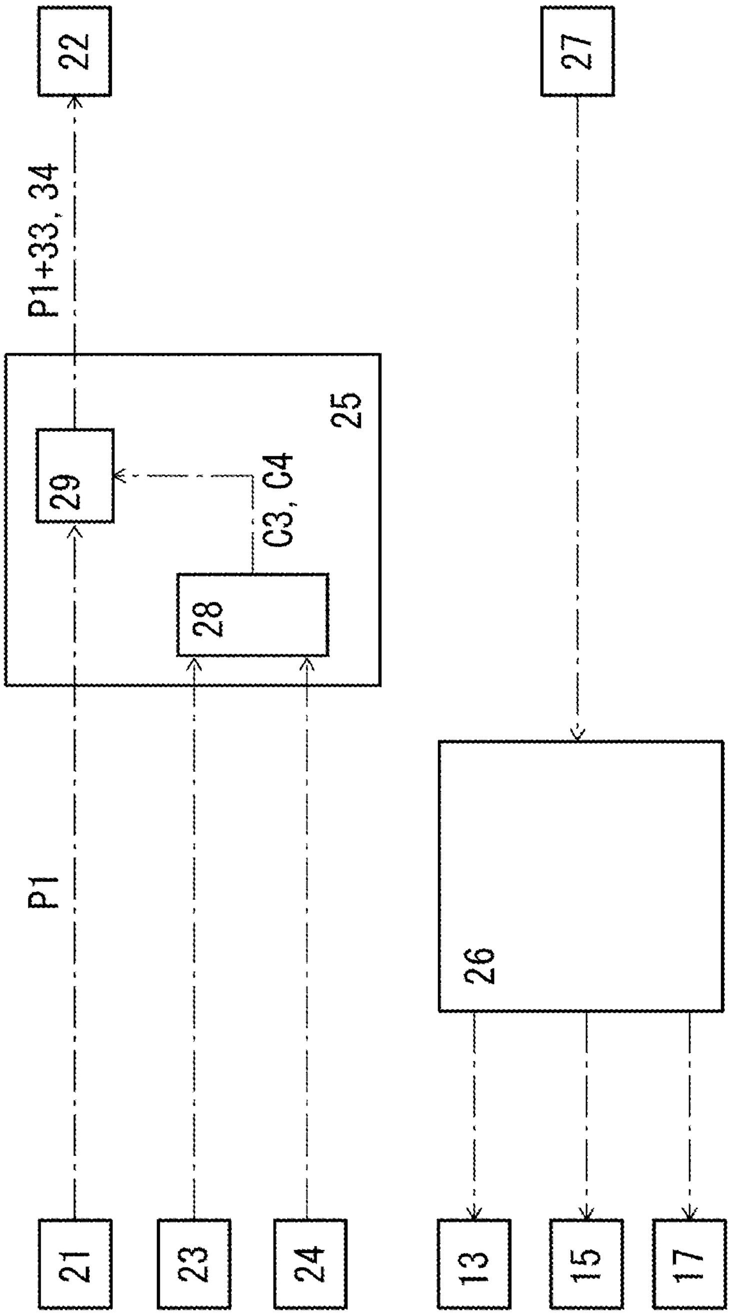
FIG. 2 is a block diagram illustrating an example of a control system in FIG. 1.

As shown in FIG. 2 as an example, the control device 25 has a calculation unit 28 and a combining unit 29 as functional elements. The calculation unit 28 is a functional element that calculates two-dimensional coordinates of landing-surface center point C3 and projection point C4 in the image P1 based on three-dimensional positions acquired by the position acquisition devices 23 and 24. The combining unit 29 is a functional element that performs image processing for superimposing a landing-surface mark 33 indicating landing-surface center point C3 and a projection mark 34 indicating projection point C4 and on the image P1 captured by the camera 21, based on the two-dimensional coordinates calculated by the calculation unit 28. Each functional element is a program stored in the internal storage device and executed by the CPU at appropriate timings. Note that each functional element may be in the form of a device that functions separately from one another instead of in the form of a program.

Figure 3:
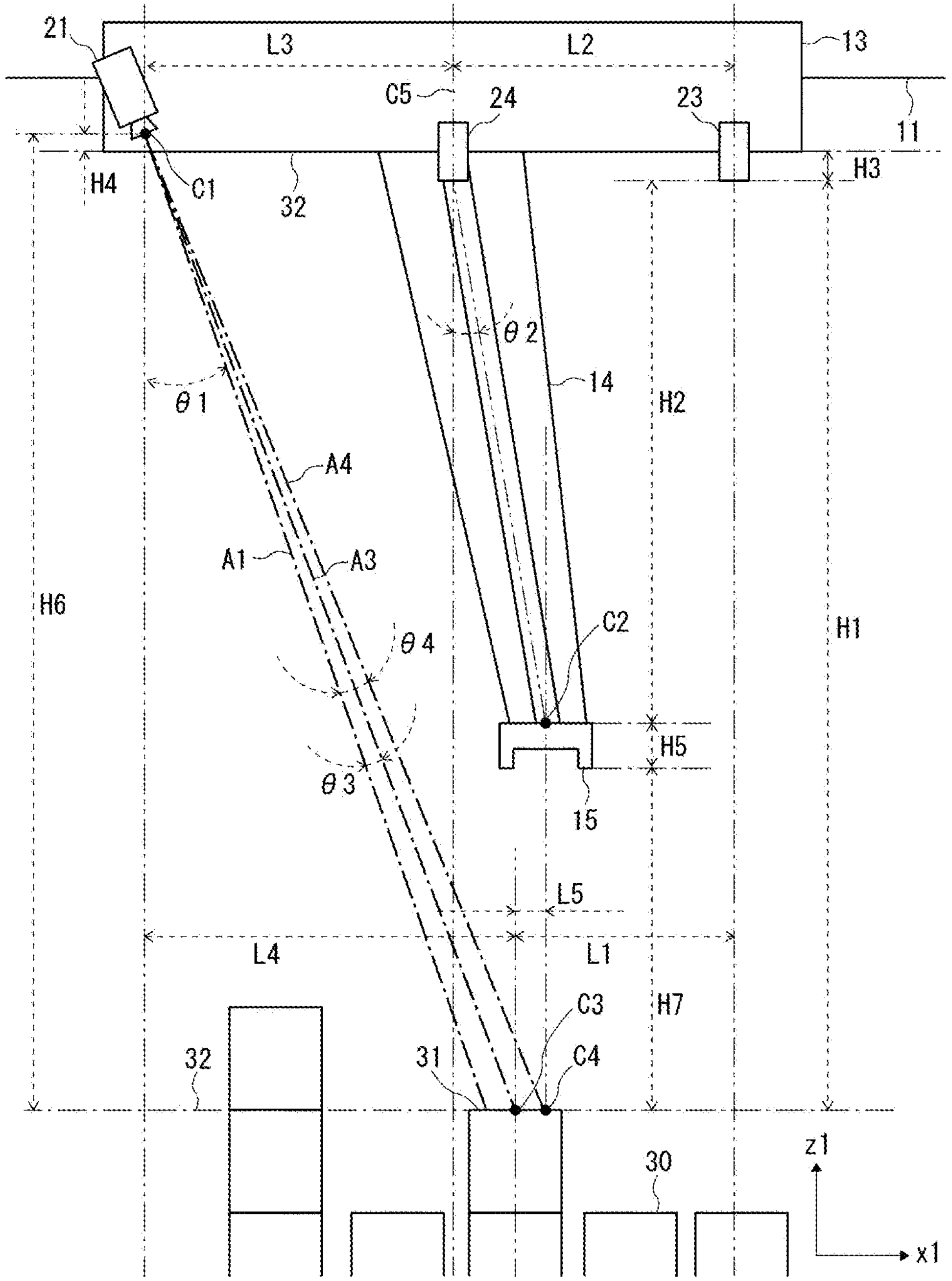
FIG. 3 is an explanatory diagram illustrating an example of the positional relationship between the spreader and the landing surface in FIG. 1.

As shown in FIG. 3 as an example, the calculation unit 28 calculates landing-surface-formed angle θ3 formed by optical axis A1 and line segment A3 connecting camera center point C1 and landing-surface center point C3, and it also calculates projection-point-formed angle θ4 formed by optical axis A1 and line segment A4 connecting camera center point C1 and projection point C4. Then, the calculation unit 28 uses the calculated landing-surface-formed angle θ3 and projection-point-formed angle θ4 to calculate the two-dimensional coordinates of landing-surface center point C3 and projection point C4 in the image P1.

Note that it is assumed in the following that the y1 coordinates of the plane positions (x1 coordinate, y1 coordinate) of spreader center point C2, landing-surface center point C3, and projection point C4 are approximately in agreement. For the container crane 10, before the spreader 15 is lifted up or down in the z1 direction, the movement of the travel devices in the y1 direction has been finished, and position adjustment in the y1 direction has been finished. The sway of the spreader 15 at the time when the spreader 15 is lifted up or down in the z1 direction occurs mainly in the movement direction of the trolley 13.

Assuming that the spreader 15 and the wire 14 constitute a simple pendulum, center point C5 in the x1 direction at the time when the calculation unit 28 calculates landing-surface-formed angle θ3 and projection-point-formed angle θ4 indicates the position of the pivot point of the simple pendulum. The reference surface 32 as the reference in the z1 direction is the horizontal plane including center point C5 which is the pivot point. In other words, center point C5 is not necessarily the center of the trolley 13 in the x1 direction, and the reference surface 32 is not necessarily the lower end surface of the trolley 13.

In the figure, H1 and H2 are measurement values that the position acquisition device 23 acquires, H3 to H5 are setting values set in advance, and H6 and H7 are calculation values that the calculation unit 28 calculates. Each value indicates a height defined such that the lower side in the z1 direction is plus and the upper side is minus. Measurement value H1 is the height from the lower end of the position acquisition device 23 to the landing surface 31. Measurement value H2 is the height from the lower end of the position acquisition device 23 to the upper surface of the spreader 15. Setting value H3 is the height from the reference surface 32 to the lower end of the position acquisition device 23. Setting value H4 is the height from the reference surface 32 to camera center point C1. Setting value H5 is the height from the upper end to the lower end of the spreader 15. Calculation value H6 is the height from camera center point C1 to the landing surface 31. Calculation value H7 is the height from the lower end of the spreader 15 to the landing surface 31. Note that when the spreader 15 is holding the container 30, setting value H5 is the height from the upper end of the spreader 15 to the lower end of the container 30.

Note that in the case where measurement value H2 is acquired based on the length of unwound rope, measurement value H2 is the height from the reference surface 32 to the upper surface of the spreader 15.

In the figure, L1 is a measurement value that the position acquisition device 23 acquires, L2 and L3 are setting values set in advance, and L4, L5, and L6 are calculation values that the calculation unit 28 calculates. Each value indicates a length defined such that the right side in the x1 direction is plus and the left side is minus. Measurement value L1 is the length from the center in the x1 direction of the position acquisition device 23 to landing-surface center point C3. Setting value L2 is the length from center point C5 to the center in the x1 direction of the position acquisition device 23. Setting value L3 is the length from center point C5 to camera center point C1. Calculation value L4 is the length from camera center point C1 to landing-surface center point C3. Calculation value L5 is the length from landing-surface center point C3 to projection point C4.

In the figure, θ1 is a setting value set in advance, θ2 is a measurement value that the position acquisition device 24 acquires, and θ3 and θ4 are calculation values that the calculation unit 28 calculates. Each value indicates an inclination defined such that the counterclockwise direction is plus and the clockwise direction is minus relative to the z1 direction. Setting value θ1 is the inclination of optical axis A1 of the camera 21. Measurement value θ2 is the sway angle of the spreader 15. Landing-surface-formed angle θ3 is the angle formed by optical axis A1 and line segment A3 connecting landing-surface center point C3 and camera center point C1. Projection-point-formed angle θ4 is the angle formed by optical axis A1 and line segment A4 connecting projection point C4 and camera center point C1.

The calculation unit 28 calculates the two-dimensional coordinates of landing-surface center point C3 in the image P1 based on landing-surface-formed angle θ3. Specifically, the calculation unit 28 calculates landing-surface-formed angle θ3 using the following equations 1 to 3. Then, based on the calculated landing-surface-formed angle θ3 and the number of pixels of the camera 21, the calculation unit 28 calculates the x2 coordinate (Lθ3) of landing-surface center point C3 in the image P1.

[Math. 1]

$$\theta 3 = \left(\tan^{-1}\frac{L4}{H6}\right) - \theta 1 \tag{1}$$

$$H6 = H1 + H3 + H4 \tag{2}$$

$$L4 = L2 + L3 - L1 \tag{3}$$

The calculation unit 28 calculates the two-dimensional coordinates of projection point C4 in the image P1 based on projection-point-formed angle θ4. Specifically, the calculation unit 28 calculates projection-point-formed angle θ4 using the above equations 2 and 3 and the following equations 4 and 5. Then, based on the calculated projection-point-formed angle θ4 and the number of pixels of the camera 21, the calculation unit 28 calculates the x2 coordinate (Lθ4) of projection point C4 in the image P1.

[Math. 2]

$$\theta 4 = \left(\tan^{-1}\frac{L4 + L5}{H6}\right) - \theta 1 \tag{4}$$

$$L5 = (L1 - L2) + (H2 + H3)\cdot\tan\theta 2 \tag{5}$$

The calculation unit 28 calculates calculation value H7, which is the distance to the landing surface, using the following equation 6.

$$H7 = H1 - H2 - H5 \qquad \text{[Math. 3]}$$

Figure 4:
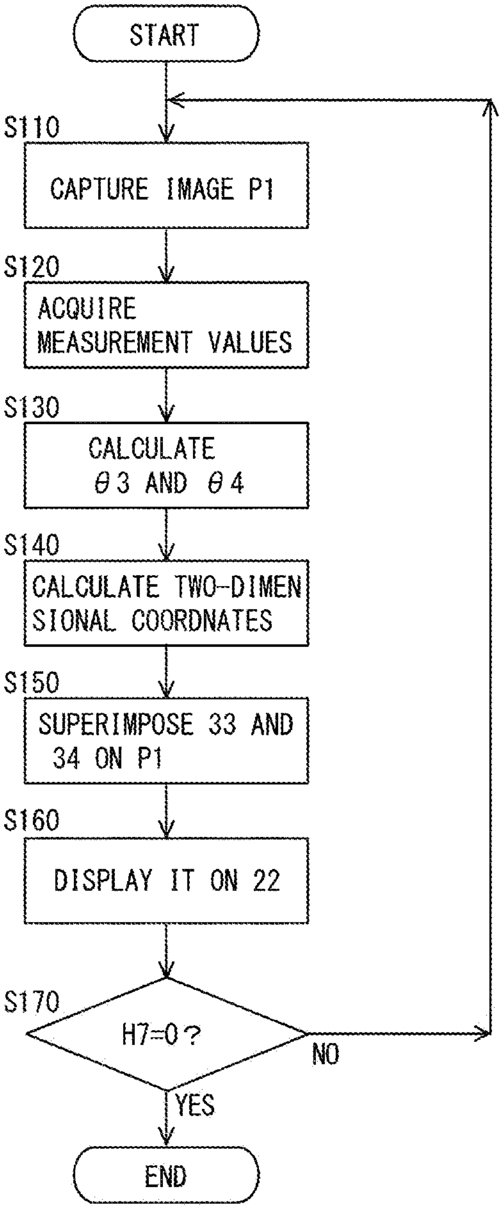
FIG. 4 is a flowchart illustrating an example of an embodiment of a control method for a container crane according to the present invention.

As shown in FIG. 4 as an example, a control method of controlling the container crane 10 using the above control system 20 is performed when the operator lands the spreader 15 onto an instructed landing surface 31 by remote operation. Specifically, this control method is a method of sequentially displaying, on the display device 22, images P1 sequentially captured by the camera 21, superimposing on them the landing-surface mark 33 and the projection mark 34 that allow the operator to understand that the positions of the spreader 15 and the landing surface 31 have agreed with each other in plan view.

When the operator performs operation for landing the spreader 15 with the operation device 27, the camera 21 captures an image P1 of the spreader 15 and portions below the spreader 15 including the landing surface 31 (S110). Next, the position acquisition devices 23 and 24 acquires the measurement values (H1, H2, L1, θ2) (S120).

Then, the calculation unit 28 of the control device 25 calculates landing-surface-formed angle θ3 and projection-point-formed angle θ4 based on the measurement values and the setting values (S130). After that, the calculation unit 28 calculates the two-dimensional coordinates of landing-surface center point C3 and projection point C4 in the image P1, based on landing-surface-formed angle θ3, projection-point-formed angle θ4, and the number of pixels of the camera 21 (S140). Next, based on the calculated two-dimensional coordinates, the combining unit 29 of the control device 25 performs image processing to superimpose, on the image P1, the landing-surface mark 33 indicating landing-surface center point C3 and the projection mark 34 indicating projection point C4 (S150).

Then, the display device 22 displays the image P1 on which the landing-surface mark 33 and the projection mark 34 are superimposed (S160). After that, the control device 25 determines whether the spreader 15 has landed on the landing surface 31 (S170). If it is determined that the spreader 15 has not landed, the process returns to S110. On the other hand, if it is determined that the spreader 15 has landed on the landing surface 31, this control method finishes.

Figure 5:
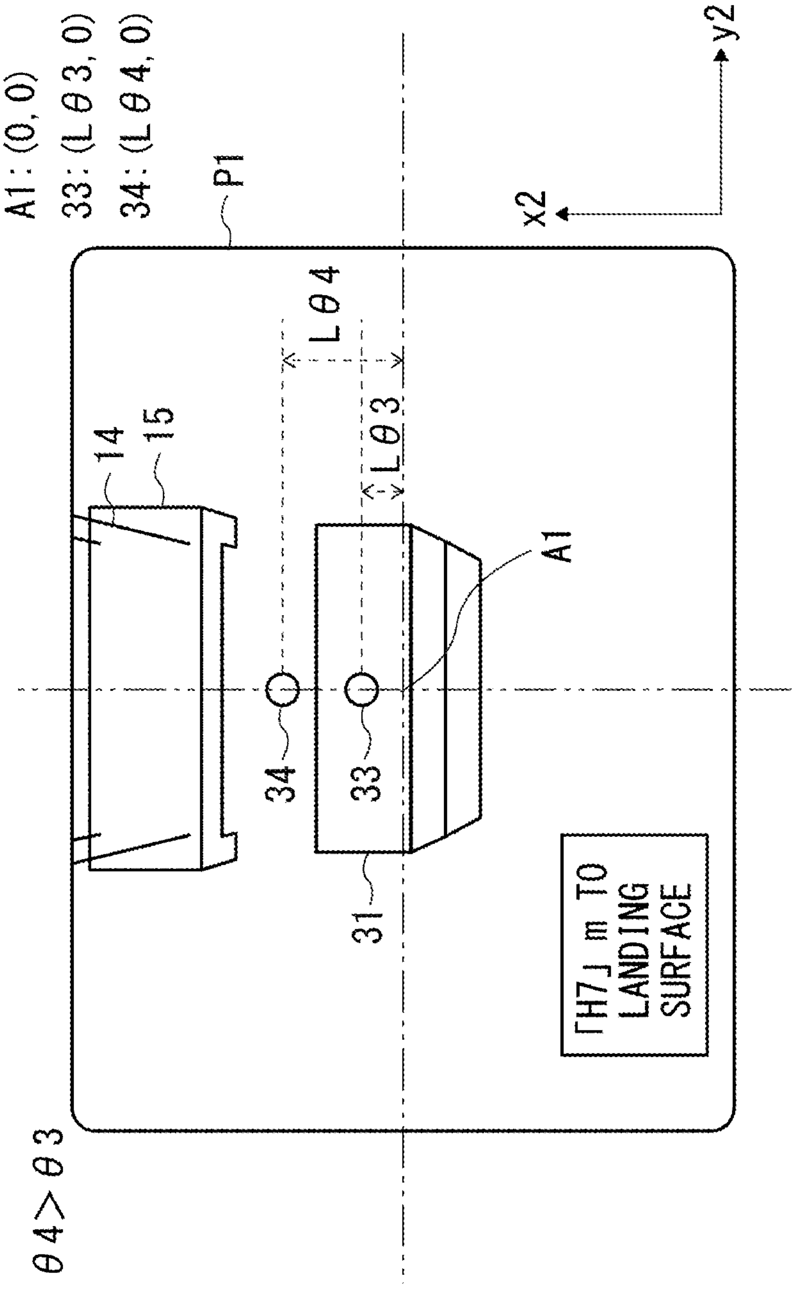
FIG. 5 is an explanatory diagram illustrating an example of an image displayed by the display device in FIG. 1, in which the positions of the spreader and the landing surface are not in agreement in plan view.

As shown in FIG. 5 as an example, in the image P1 displayed on the display device 22, the landing-surface mark 33 and the projection mark 34 are apart, and thus, the positions of the spreader 15 and the landing surface 31 are not in agreement in plan view. In the image P1, with respect to the origin point (0, 0) representing optical axis A1 which is the center of the image P1, the two-dimensional coordinates of the landing-surface mark 33 are (Lθ3, 0) and the two-dimensional coordinates of the projection mark 34 are (Lθ4, 0). At this time, projection-point-formed angle θ4 is larger than landing-surface-formed angle θ3, and the projection mark 34 is displayed on the sea side of the landing-surface mark 33 in the x2 direction. The operator, seeing this display, moves the trolley 13 to the land side in the x2 direction or adjusts the timing such that the positions of the spreader 15 and the landing surface 31 agree with each other.

Figure 6:
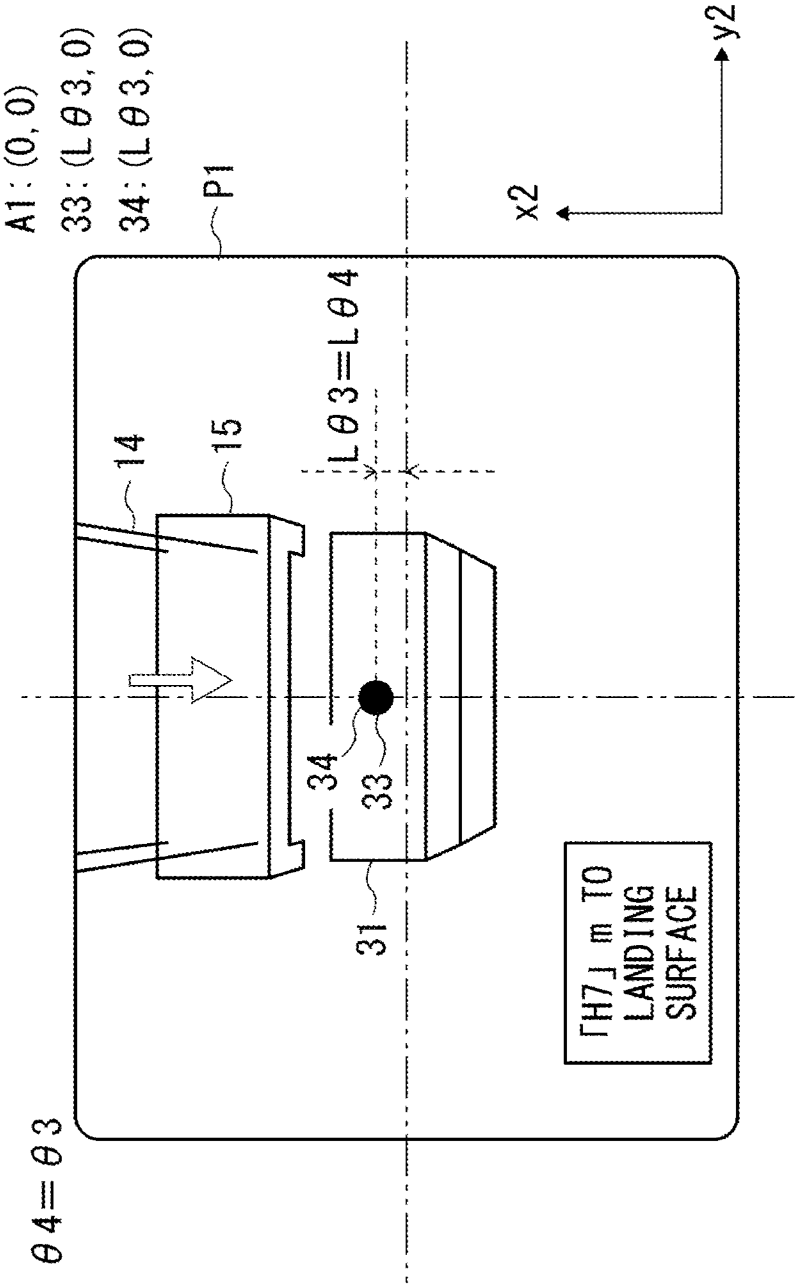
FIG. 6 is an explanatory diagram illustrating an example of an image displayed by the display device in FIG. 1, in which the positions of the spreader and the landing surface are in agreement in plan view.

As shown in FIG. 6 as an example, in the image P1 displayed on the display device 22, the landing-surface mark 33 and the projection mark 34 are at the same position, and thus, the positions of the spreader 15 and the landing surface 31 are in agreement in plan view. In the image P1, with respect to the origin point (0, 0) representing optical axis A1 which is the center of the image P1, the two-dimensional coordinates of the landing-surface mark 33 are (Lθ3, 0) and the two-dimensional coordinates of the projection mark 34 are also (Lθ3, 0). At this time, projection-point-formed angle θ4 is equal to landing-surface-formed angle θ3. The operator, seeing this display, lands the spreader 15.

The above control system 20 displays, on the display device 22, the image P1 with the landing-surface mark 33 and the projection mark 34 superimposed, as a display that allows the operator to understand that the positions of the spreader 15 and the landing surface 31 have agreed with each other in plan view, based on the plane positions of the spreader 15 and the landing surface 31. Since the operator of the container crane 10 lowers the spreader 15 based on the state of positional relationship between those landing-surface mark 33 and projection mark 34, the operator can land the spreader 15 on the landing surface 31 such that the positions of the spreader 15 and the landing surface 31 are in agreement.

As has been described above, the control system 20 tells the operator accurately the timing of lowering the spreader 15 by showing the state of positional relationship between the landing-surface mark 33 and the projection mark 34. Landing the spreader 15 according to the state of positional relationship between the landing-surface mark 33 and the projection mark 34 is advantageous for an inexperienced operator to reduce the time necessary for the position adjustment of the spreader 15 and the landing surface 31 in plan view, improving the cargo handling efficiency.

Note that for the display that allows the operator to understand that the positions of the spreader 15 and the landing surface 31 have agreed with each other in plan view, characters or symbols may be displayed at the moment when the positions of the spreader 15 and the landing surface 31 agree with each other in plan view, in addition to displaying the state of positional relationship between the landing-surface mark 33 and the projection mark 34. As an alternative, besides the display device 22, for example, a device may be added that generates a sound that allows the operator to understand that the positions of the spreader 15 and the landing surface 31 have agreed with each other in plan view.

The control system 20 displays the state of positional relationship between the landing-surface mark 33 and the projection mark 34 on the display device 22 by sequentially superimposing the landing-surface mark 33 and the projection mark 34 on the image P1 as a change over time from the state where the positions of the spreader 15 and the landing surface 31 are not in agreement in plan view to the state where the positions are in agreement. Thus, the operator can adjust the timing at which the operator is to lower the spreader 15, seeing the state of positional relationship between the landing-surface mark 33 and the projection mark 34, changing over time, and hence, this is advantageous to reduce the time necessary for the position adjustment of the spreader 15 and the landing surface 31 in plan view.

In particular, even in the case where the spreader 15 is swaying cyclically like a pendulum, the control system 20 makes it possible to lower the spreader 15 at the time when the positions are the spreader 15 and the landing surface 31 are in agreement in plan view. This is advantageous to reduce the waiting time until the sway of the spreader 15 becomes small enough.

Note that the cycle (amplitude) of the spreader 15 swaying may be measured, and projection point C4 may represent an estimated point that is estimated from the cycle. Remote operation of the container crane 10 may cause the time delay from the time of operating the operation device 27 until each device is driven or the time delay from the time when the camera 21 captures an image until the image is displayed on the display device 22. Because of these time delays, even if the operator adjusts the timing of lowering the spreader 15, seeing the state of positional relationship between the landing-surface mark 33 and the projection mark 34, there is a possibility that the position of the spreader 15 does not agree with the position of the landing surface 31 when it actually landed. Hence, use of the estimated point, as projection point C4, in which those time delays are taken into account is advantageous to cancel the positional error caused by various kinds of time delays.

In addition to the landing-surface mark 33 and the projection mark 34, the control system 20 may superimpose, on the image P1, a spreader mark indicating spreader center point C2 which is the center of the spreader 15. The two-dimensional coordinates of spreader center point C2 in the image P1 can be calculated based on the angle formed relative to optical axis A1 in the same way as for landing-surface center point C3 and projection point C4. Note that a mark substituted for the spreader mark may be directly attached to the spreader 15. Adding a display indicating spreader center point C2 in addition to the landing-surface mark 33 and the projection mark 34 as described above increases the number of marks, which is advantageous to understand the positional relationship between the spreader 15 and the landing surface 31.

The control system 20 is for remotely operating the container crane 10 and reproduces the view of the operator on board the cab by showing the image P1 captured by the camera 21. Hence, the camera lens 21*a* of the camera 21 is directed obliquely downward, and a sophisticated skill is necessary to find, by only seeing the image P1, the state where the position of the spreader 15 is in agreement with the position of the landing surface 31 which is several tens meters below the spreader 15. Thus, the control system 20 calculates the two-dimensional coordinates of landing-surface center point C3 and projection point C4 in the image P1 and superimposes the landing-surface mark 33 and the projection mark 34, indicating those, on the image P1. This is advantageous to understand the positional relationship between the spreader 15 and the landing surface 31, allowing an inexperienced operator to perform highly accurate position adjustment in the same way as a skilled operator does.

Since the camera lens 21*a* of the camera 21 is directed obliquely downward as described above, in order to calculate the two-dimensional coordinates on the image P1, it is necessary to understand the positional relationship relative to this optical axis A1 of the camera 21. Hence, the control system calculates the two-dimensional coordinates of landing-surface center point C3 and projection point C4 in the image P1, based on Landing-surface-formed angle θ3 and projection-point-formed angle θ4. This is advantageous to calculate the two-dimensional coordinates of landing-surface center point C3 and projection point C4 in the image P1 with high accuracy.

Every time the control system 20 calculates the two-dimensional coordinates of landing-surface center point C3 and projection point C4 in the image P1, the control system 20 measures measurement value H1, H2, L1, and θ2, using the position acquisition devices 23 and 24. Thus, even if the position of the landing surface 31 and the position of the spreader 15 change, resulting from rocking of a ship by waves or other factors, the two-dimensional coordinates in the image P1 can be calculated according to the change. This is advantageous to highly accurate position adjustment.

The control system 20 displays calculation value H7, which is the distance by which the spreader 15 moves before landing on the landing surface 31, in the image P1 displayed on the display device 22. Since calculation value H7 which is the distance to the landing surface is displayed as described above, it is possible to tell the operator the timing to slow down the speed of lowering the spreader 15. This is advantageous to reduce the shock at the time when the spreader 15 lands on the landing surface 31.

The container crane 10 only needs to include a girder extending in one direction, a trolley that is supported by this girder and moves in the extending direction of this girder, and a spreader suspended from this trolley with wire, and the container crane 10 is not limited to cranes that load and unload the container 30 onto and from a ship. Examples of the container crane include gantry cranes and ceiling cranes which load and unload containers unto and from foreign chasses or storage lanes at container terminals.

Although in the foregoing embodiment, it is assumed in FIG. 3 that the y1 coordinates of the plane positions (x1 coordinates, y1 coordinates) of spreader center point C2, landing-surface center point C3, and projection point C4 are approximately in agreement, the y1 coordinates may also be sequentially calculated in the same way as for the x1 coordinates. When the container crane 10 moves in the y1 direction with the travel devices 16, it is also possible to calculate the landing-surface-formed angle and the projection-point-formed angle relative to optical axis A1 in front view and perform position adjustment of the y2 coordinates in the image P1.

The above control system 20 is for remotely operating the container crane 10. Utilizing this control system 20, it is also possible to automate the operation of the container crane 10, for example, by defining the state of positional relationship between projection point C4 and landing-surface center point C3 as a deviation and the control device 25 automatically operating the trolley 13 and the spreader 15 based on the deviation.

EXPLANATION OF REFERENCE NUMERALS

10 container crane
11, 12 girder
13 trolley
14 wire
15 spreader
20 control system
21 camera
22 display device
30 container
31 landing surface
P1 image

The invention claimed is:

1. A control system for a container crane including a girder extending in one direction, a trolley that is supported by the girder and moves in the one direction in which the girder extends, and a spreader suspended from the trolley with wire, characterized in that the control system comprises:

a camera that is disposed on the trolley and sequentially captures an image of the spreader and a portion below the spreader;

a display device that sequentially displays the image captured by the camera;

a position acquisition device that acquires three-dimensional positions of the spreader and a landing surface on which the spreader is to land; and a control device connected to the camera, the display device, and the position acquisition device, and based on the three-dimensional positions of the spreader and the landing surface acquired by the position acquisition device, the control device calculates two-dimensional coordinates, in the image, of a projection point at which a spreader center point, which is the center of the spreader in plan view, is vertically projected on a horizontal plane including the landing surface and a landing-surface center point which is the center of the landing surface in plan view, and superimposes, on the image, a projection mark indicating the projection point and a landing-surface mark indicating the landing-surface center point, an indication display from which it is understood that the positions of the spreader and the landing surface have agreed with each other in plan view, and the control device displays a resultant image with the image and the indication display superimposed on the display device.

2. The control system for a container crane according to claim 1, wherein as the indication display, the control device sequentially superimposes, on the image, change over time from a state where the positions of the spreader and the landing surface are not in agreement in plan view to a state where the positions of the spreader and the landing surface are in agreement in plan view.

3. The control system for a container crane according to claim 1, wherein based on the three-dimensional positions of the spreader and the landing surface acquired by the position acquisition device, the control device calculates two-dimensional coordinates of the spreader center point in the image and superimposes the spreader center point on the image as the indication display.

4. The control system for a container crane according to claim 1, wherein the camera is disposed on an outer side of the trolley, and an optical axis of the camera passing through a camera center point which is the center of a lens of the camera is inclined relative to the vertical direction such that the upper portion of the optical axis is directed on a side farther from the center of the trolley and the lower portion of the optical axis is directed on a side closer to the center of the trolley, and based on the three-dimensional positions of the spreader and the landing surface acquired by the position acquisition device, the control device calculates a projection-point-formed angle formed by the optical axis and a line segment connecting the camera center point and the projection point and a landing-surface-formed angle formed by the optical axis and a line segment connecting the camera center point and the landing-surface center point, and the control device calculates the two-dimensional coordinates of the projection point and the landing-surface center point in the image using the calculated projection-point-formed angle and the calculated landing-surface-formed angle.

5. The control system for a container crane according to claim 2, wherein the position acquisition device is capable of acquiring three-dimensional positions including height positions of the spreader and the landing surface in addition to the plane positions of the spreader and the landing surface, and based on the three-dimensional positions of the spreader and the landing surface acquired by the position acquisition device, the control device calculates two-dimensional coordinates, in the image, of a projection point at which a spreader center point which is the center of the spreader in plan view is vertically projected on a horizontal plane including the landing surface and a landing-surface center point which is the center of the landing surface in plan view, and the control device superimposes, on the image, a projection mark indicating the projection point and a landing-surface mark indicating the landing-surface center point, as the indication display.

6. The control system for a container crane according to claim 3, wherein the camera is disposed on an outer side of the trolley, and an optical axis of the camera passing through a camera center point which is the center of a lens of the camera is inclined relative to the vertical direction such that the upper portion of the optical axis is directed on a side farther from the center of the trolley and the lower portion of the optical axis is directed on a side closer to the center of the trolley, and based on the three-dimensional positions of the spreader and the landing surface acquired by the position acquisition device, the control device calculates a projection-point-formed angle formed by the optical axis and a line segment connecting the camera center point and the projection point and a landing-surface-formed angle formed by the optical axis and a line segment connecting the camera center point and the landing-surface center point, and the control device calculates the two-dimensional coordinates of the projection point and the landing-surface center point in the image using the calculated projection-point-formed angle and the calculated landing-surface-formed angle.

7. A control method of controlling a container crane, including lowering a spreader suspended with wire from a trolley that is supported by a girder extending in one direction and travels in the one direction in which the girder extends, and landing a lower end of the spreader or a lower end of a container held by the spreader on a landing surface, characterized in that the control method comprises:

sequentially capturing an image of the spreader and a portion below the spreader with a camera disposed on the trolley;

acquiring three-dimensional positions of the spreader and the landing surface on which the spreader is to land with a position acquisition device; and with a control device, calculating two-dimensional coordinates, in the image, of a projection point at which a spreader center point, which is the center of the spreader in plan view, is vertically projected on a horizontal plane including the landing surface and a landing-surface center point which is the center of the landing surface in plan view, and creating a projection mark indicating the projection point and a landing-surface mark indicating the landing-surface center point, as an indication display from which it is understood that the positions of the spreader and the landing surface have agreed with each other in plan view based on the acquired three-dimensional positions of the spreader and the landing surface, superimposing the created indication display on the image, and sequentially displaying a resultant image with the image and the indication display superimposed on a display device.

* * * * *